United States Patent [19]
Kitaura et al.

[11] Patent Number: 4,566,107
[45] Date of Patent: Jan. 21, 1986

[54] LASER APPARATUS

[75] Inventors: Tomimaro Kitaura; Yutaka Ohashi; Masami Yoneda, all of Saitama, Japan

[73] Assignee: Fuji Photo Optical Co., Ltd., Saitama, Japan

[21] Appl. No.: 522,355

[22] Filed: Aug. 11, 1983

[30] Foreign Application Priority Data

Aug. 13, 1982 [JP] Japan .................. 57-139853

[51] Int. Cl.$^4$ .................. H01S 3/00
[52] U.S. Cl. .................. 372/38; 372/72; 372/92
[58] Field of Search .................. 372/97, 70, 72, 33, 372/61, 69, 38

[56] References Cited

U.S. PATENT DOCUMENTS 3,164,781 1/1965 Goldberg .................. 372/72
4,397,023 8/1983 Newman et al. .................. 372/69

FOREIGN PATENT DOCUMENTS 2545670 4/1977 Fed. Rep. of Germany ........ 372/69
4181833 2/1963 Japan .
44-15388 7/1969 Japan .
4945944 9/1970 Japan .
50-29429 8/1975 Japan .

Primary Examiner—William L. Sikes
Assistant Examiner—Jr. Scott
Attorney, Agent, or Firm—Young & Thompson

[57] ABSTRACT

A laser apparatus includes two sets of pumping arrangements for providing pumping energy for a laser medium used in common, each comprising a reflector with a reflective surface which defines an elliptical cavity and a pumping source located along a focal line of the ellipse formed by the elliptical cavity. One pumping arrangement is usually used and the other is held in reserve as a spare. When the former is out of order, the latter is automatically made available.

8 Claims, 7 Drawing Figures

LASER APPARATUS

BACKGROUND OF THE INVENTION

The present invention relates to a laser apparatus and, more particularly, to an improved laser apparatus having an optical pumping arrangement for providing pumping energy for a laser medium which comprises a reflector with a highly reflective inner surface which defines an elliptical cavity and along a focal line of the ellipse formed by which a laser medium and a pumping source are each located.

As is well-known, laser instrumentation devices are available for medical treatment of a living organism, hemostasis or coagulation through the application of laser emission thereto. Even more particularly, it is possible greatly to improve the medical availability of laser instrumentation devices by applying laser emission to the living body through an endoscope.

But it is necessary to make sure that laser emission does no harm to the human body. Therefore, various kinds of measures are taken to ensure the safety of living bodies. The safety measures against laser emission have, however, been taken on the assumption that laser emission is always provided without any abnormality such as an unexpected decline of laser emission or a discontinuation of laser emission which is harmful for, in particular, a human body.

During the application of a laser instrumentation device to a human body, the human body is exposed to various dangers and there may even be jeopardy to life. Therefore, in order to deal with an emergency, it is necessary to perform a surgical operation in a conventional way. One of important causes from which an unexpected decline or discontinuation of laser emission arises is that a pumping source for exciting the laser medium is functionally deteriorated or has broken down. In such a case, if the pumping source can be immediately changed to provide pumping energy, the human body under treatment or surgical operation will be protected to some extent from fatal dangers. However, such immediate changing of the pumping source is next to impossible for personnel engaged in the surgical operation as a result of the medically unacceptable time delay until the discovery that an unexpected decline or discontinuation of laser emission has taken place in the pumping source. Even if it is possible to find the fact in a time medically allowed, it is, as a matter of fact, difficult to change the pumping source because of the solidly built laser apparatus in consideration of the safety of operators and of the laser apparatus itself. On the other hand, the fact that the pumping source does not frequently burn out or decline in output energy makes it difficult to predict a functional deterioration of the pumping source. This makes it ordinarily unnecessary to provide a spare pumping source in operation. Consequently, in an emergency, the patient is in considerable danger.

SUMMARY OF THE INVENTION

Therefore, the primary object of the present invention is to provide a laser apparatus wherein a pumping source for providing energy for exciting a laser medium is, when functionally disordered, automatically replaced with a spare so as to ensure the substantially continuous excitation of a laser medium during a surgical operation.

It is another object of the present invention to provide a laser apparatus wherein an auxiliary pumping source is activated to provide pumping energy for a laser medium by changing power circuits when a lowered electric current flowing through a main pumping source upon the detection of pumping energy below a predetermined value.

In accomplishing these and other objects, according to preferred embodiments of the present invention, there is provided a combination of a laser medium such as a solid-state laser rod and at least two sets of optical arrangements each including a source for providing pumping energy, one of these comprising an auxiliary optical arrangement automatically made available when the pumping source of the other is out of order.

BRIEF DESCRIPTION OF THE DRAWINGS

These and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals and symbols throughout the views of the accompanying drawings.

DESCRIPTION OF THE PREFERRED EMBODIMENT

Figure 1:
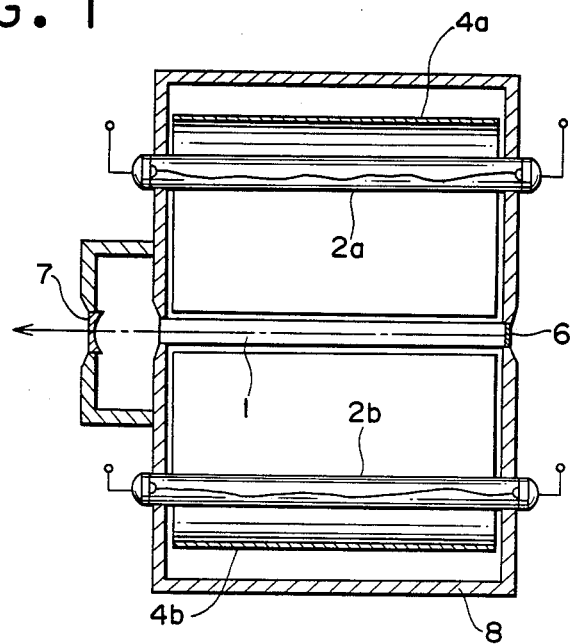
FIG. 1 is a cross sectional view showing a laser apparatus in accordance with an embodiment of the present invention.
Figure 2:
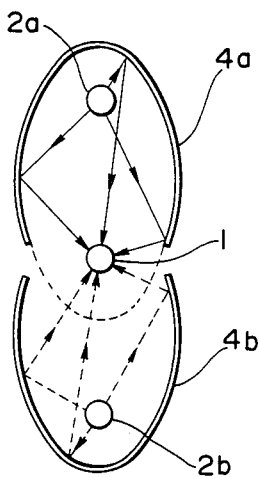
FIG. 2 is a schematic view of the optical arrangements of FIG. 1 each including a pumping source for a laser medium.

In the laser apparatus shown in FIGS. 1 and 2, there is provided two optical arrangements for providing pumping energy for the excitation of a laser medium. The first or main one of the optical arrangements comprises a pumping source 2a which provides pumping energy for exciting a laser medium and a reflector 4a with a highly reflective inner surface which defines an elliptical cavity on whose two focal lines a laser rod 1 and the pumping source 2a are located. The second or auxiliary arrangement also comprises a pumping source 2b and a reflector 4b analogous to the first one. The first and second optical arrangement are located in symmetry with respect to the laser rod 1 which is common to them. A solid-state laser medium such as ruby or YAG is preferably used; while as pumping sources 2a, 2b, krypton arc lamps are employed.

Although, in the embodiment shown in FIGS. 1 and 2, reflectors 4a and 4b are shown spaced apart, it may be effective for improving pumping efficiency if only a little to join them at their opposite open ends. All elements of the laser apparatus are housed in a sturdy metal container 8. The main and auxiliary optical arrangements are alternatively controlled by a control device shown in FIG. 3 so as to perform their intended function. Usually, the main pumping source 2a is used to provide pumping energy for the laser rod 1 and the auxiliary is provided as an idle spare. The pumping energy from the main pumping source 2a falls, partly after reflection by the reflector 4a, onto the common laser rod 1, powering the latter to produce stimulated laser emission which is then amplified by a resonance system comprising a completely reflecting concave mirror 6 and a partially reflecting mirror 7 located at opposite ends of the laser medium 1, respectively, to be output with remarkably high energy.

The laser apparatus is adapted to automatically substitute the auxiliary pumping surce 2b for the main pumping source 2a to continue the production of amplified laser emission when the latter is impaired in operation. The replacement of pumping source is caused by a controlling device shown in FIG. 3 which principally comprises a power supply 21, a switchover means 22 for power supply circuits, a switching means 23 which is operationally controlled by the switchover means 22 to selectively close two power supply circuits and a current detecting device 24 for activating the switchover means 22 when a lowered electric current flowing through either of the two power supply circuits below the predetermined value is detected. One power supply circuit called hereinafter a main or first system comprises the power supply 21, a power switch 31, a closed switch with contacts 23a and 23b and the pumping source 2a, and the other, namely an auxiliary or second system, comprises the power supply 21, a power switch 31, a normally open switch with contacts 23a and 23c and the pumping source 2b. Normally, the pumping source 2a is energized to produce pumping energy for exciting the laser rod when the power switch 31 is turned on to activate the main power supply circuit. The main pumping source 2a having been energized, the current detecting device 24 detects electric current flowing through the main power supply circuit including the main pumping source 2a, in proportion to which an amplified voltage is present at a connection 25. A decline of current flowing through the main pumping source 2a causes the current detecting device to provide an output by which a raised voltage is induced at the connection 25. As soon as a raised voltage equal to the trigger voltage of SCR 26 is induced at the connection 25, SCR 26 is caused to be conductive to energize an electromagnetic relay 32 cooperating with the switching means 23. As a result of this, the electromagnetic relay 32 instantaneously brings and keeps the contact 23a into contact with the contact 23c to activate the auxiliary power supply circuit, energizing the auxiliary pumping source 2b. As will be apparent from the above description, correlating the lower limit current necessary to energize the pumping source 2a with the trigger voltage of SCR 26 of the switchover means 22 according to the correlation between the input and output of the current detecting device 24, the second power supply circuit is automatically enabled to supply power to the preparatory pumping source 26 upon a breakdown or the start of breakdown of the main pumping source 2a owing to the deterioration or the burn-out thereof.

Figure 3:
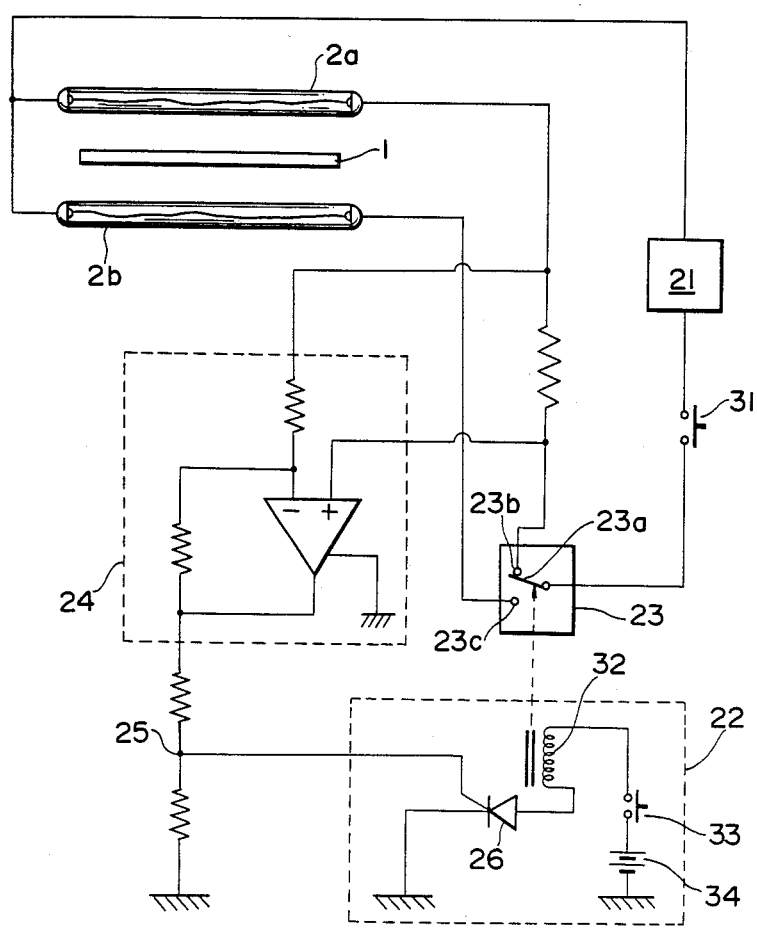
FIG. 3 is a diagram of the circuit for alternatively activating a main and a spare pumping source.

In FIG. 3, a switch 33 included in the switchover means 22 is operated to supply power to the electromagnetic relay 32 from a power supply 34 at the time the main switch 31 is turned on. While the switchover means 22 keeps the second power supply circuit available, it can allow the first power supply circuit to be available because of the fact that the relay 32 is disenergized and thus brings the contact 23a into contact with the contact 23b when the switch 33 is turned off. In brief, the laser apparatus out of operation is always in the state of preparedness of the first power supply circuit. When the switch 31 is turned on to supply power to the circuit upon using the laser apparatus again, the replaced pumping source 2a is energized to provide pumping energy and, if the main pumping source 2a is left unchanged, the auxiliary pumping source 2b is energized at the same time the switch is turned on.

Although, in this embodiment, there is considered no safety measure against malfunction or the breakdown, it is possible for those skilled in the art to additionally provide a current detecting means, a switchover means for power supply circuits and other necessary elements in order to alternatively use the two pumping sources during their useful life period.

There are shown in FIGS. 4 to 7 other embodiments of the present invention of which the purpose is to improve the efficiency of use of the pumping energy from the pumping source by making it reflect from the reflector. There may be a disadvantage in the laser apparatus shown in FIGS. 1 and 2 in that the efficiency of the use of pumping energy from the source is reduced because of the fact that each reflector with a highly reflective inner surface defines an elliptical cavity forming an incomplete ellipse with a part cut away at the side of the laser rod as shown by the dotted line in FIG. 2 and, thereby, a part of the pumping energy directed to the cut-away part of the ellipse cannot contribute to exciting the laser rod 1.

Figure 4:
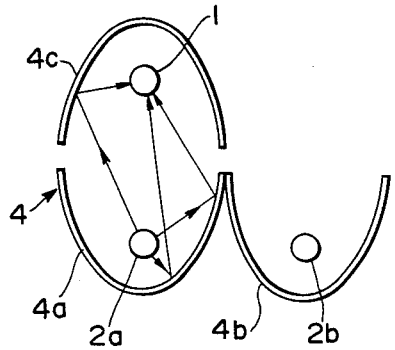
FIG. 4 is a schematic view showing optical arrangements in accordance with another embodiment of the present invention.
Figure 5:
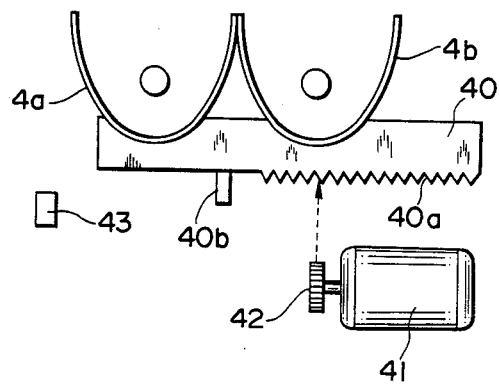
FIG. 5 is a schematic view showing a mechanism for interchanging optical arrangements shown in FIG. 4.

Therefore, in the laser apparatus shown in FIGS. 4 and 5, the first or main optical arrangement comprises a reflector 4 defining a substantially complete elliptical cavity, along the focal line of the ellipse formed by which a laser rod 1 and a main pumping source 2a are each located. The complete elliptical reflector 4 is, however, divided into two semi-elliptical reflectors 4a and 4c, the one including the laser rod 1 is fixed to the container and the other accommodating the pumping source 2a is adapted to move in a horizontal direction. On the other hand, the second or preparatory optical arrangement is the same in construction as the main one and is complete with the fixed semi-elliptical reflector 4c and another semi-elliptical reflector 4b provided with another pumping source 2b by which the semi-elliptical reflector 4a i.e. the auxiliary pumping source 2a is replaced. The laser apparatus mentioned above can be operated with the controlling device shown in FIG. 3 in such a way that, in cooperation with the switchover operation of the power supply circuit from one to the other, for instance upon the operation of the switching means 23, a driving means such as an electric motor is activated to move simultaneously both semi-elliptical reflectors 4a and 4b in a horizontal direction so as to make a complete elliptical reflector 4.

The replacement of the pumping source is effected by a replacing mechanism, for instance, shown in FIG. 5 which comprises a movable support member 40 with a rack 40a, a driving motor 41 of which the rotating shaft at its end is provided with a gear 42 meshing with the rack 40 and a limit switch 43 located at a proper position on the container. On the movable member 40 the two semi-elliptical reflectors 4a and 4b are mounted side by side. The driving motor 41, upon energizing the electromagnetic relay 32 shown in FIG. 3, is caused to start its normal rotation so as to rectilinearly move the support member 40 in the left-hand direction in FIG. 5, replacing the main optical arrangement with the auxiliary one. At the end of the replacement motion, a projection 40b of the support member 40 comes into contact with the limit switch 43, and then the latter is turned off to bring the driving motor to a stop. As a result of this, the semi-elliptical reflectors 4b and 4c are aligned to form a complete elliptical reflector. Although, in this embodiment, both semi-elliptical reflectors 4a and 4b are moved it may be possible to move the semi-elliptical reflector 4c with the laser rod 1. It should be noted in such as modofication that the laser rod 1 must be aligned on the axis of the resonance optical system after the motion.

Figure 6:
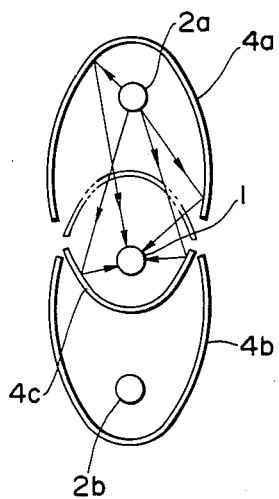
FIG. 6 is a schematic view showing optical arrangements in accordance with still another embodiment of the present invention.
Figure 7:
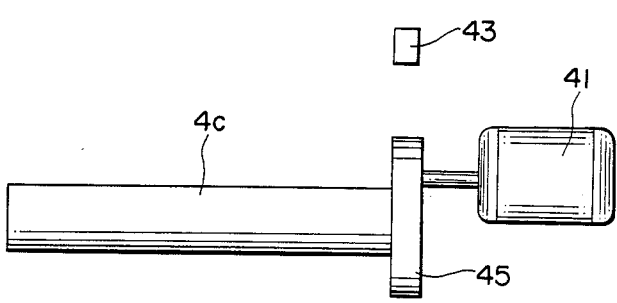
FIG. 7 is a schematic view showing a mechanism for interchanging optical arrangements shown in FIG. 6.

There is shown in FIGS. 6 and 7 still another embodiment of the present invention which overcomes the disadvantage of the embodiment shown in FIGS. 4 and 5, that the semi-elliptical reflectors 4a and 4b, or 4c must be moved in company with the pumping sources 2a and 2b, or the laser rod 1 in a horizontal direction and that the space required for the horizontal motion of the reflectors makes the laser apparatus bulky. The general arrangement of the reflectors shown in FIG. 6 is similar to that shown in FIG. 2 in external appearance and comprises two fixed reflectors 4a and 4b with a highly reflective inner surface which defines an elliptical cavity, each having a cut-away portion, and a complimentary reflector with a highly reflective inner surface 4c rotatably mounted within the fixed elliptical reflector. The complementary reflector 4c can replace the cut-away portion of either the fixed elliptical reflector 4a or the other one 4b so as to define a substantially complete elliptical cavity. The main and auxiliary elliptical reflectors 4a and 4b are fixedly located in symmetry with respect to their common focal line along which the laser rod 1 is disposed. At each other focal line of the fixed elliptical reflectors 4a and 4b a pumping source 2a, 2b is disposed. A structural feature of this laser apparatus is that the complimentary reflector 4c rotatable about the common focal line is provided so as to define a substantially complete elliptical reflective surface in combination with either the fixed elliptical reflector 4a or the other one 4b. As seen in FIG. 6, the complimentary reflector 4c has an aperture of such size that it can rotate without interference with either elliptical reflector 4a or 4b.

FIG. 7 shows an embodiment of the rotating device for the coplimentary reflector 4c which comprises a driving motor 41 and a support member 45 connected at one side to the rotating shaft of the driving motor and supporting at the other side the end of the complementary reflector 4c. The support member 45 can be driven by a half turn by the driving motor 41. The laser apparatus in this embodiment is as compact in outside measurement as that shown in FIG. 2 mainly because of the fact that the essential elements such as the pumping sources, the laser rod and the greater part of the reflectors are not movable, while it has a distributory efficiency of pumping energy substantially equal to that of the laser apparatus shown in FIG. 4.

It will be apparent to those skilled in the art that, in the embodiments shown in FIGS. 4 to 7, it may be desirable to additionally provide another current detecting means and switchover means in the auxiliary power supply circuit in order to alternatively use the two pumping sources during their useful life period.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. In a laser apparatus including a reflector with a reflective inner surface which defines an elliptical cavity and along a focal line of the ellipse formed by which a laser medium and a pumping source are each located, said pumping source providing pumping energy for exciting said laser medium to produce stimulated laser emission, said apparatus comprising:

two sets of optical pumping arrangements for providing pumping energy, each comprising a reflector with a reflective inner surface which defines an elliptical cavity and a pumping source located along the focal line of the ellipse formed by said elliptical cavity, and holding a laser medium in common along the other focal line of said ellipse;

current detecting means for detecting current flowing through said pumping source; and changeover means for changing one set of said optical arrangements over to the other formerly held in reserve to be available when a current flowing through the pumping source of said one set of said optical arrangements falls below a predetermined value and is detected by said current detecting means.

2. In a laser apparatus as defined in claim 1, said changeover means being a changeover means for changing power supply circuits for said respective pumping sources.

3. In a laser apparatus as defined in claim 2, said two sets of optical pumping arrangements comprising two elliptical reflectors which are so opositely located as to have one focal line of each said ellipse in common and two pumping sources each located along the other focal line of each said ellipse.

4. In a laser apparatus as defined in claim 1, said two sets of optical pumping arrangements comprising two reflectors each having a reflective inner surface which defines a semi-elliptical cavity and including a pumping source located along a focal line of the ellipse formed by said elliptical cavity, and a common complementary reflector with a reflective surface which complements each said semi-elliptical cavity to form a complete elliptical cavity, said laser medium being disposed on a common focal line of the ellipse formed by said complete elliptical cavity.

5. In a laser apparatus as defined in claim 4, said semi-elliptical reflectors or said common complementary reflector being adapted to change their positions so as to form a combined reflector with a reflective surface which defines a complete elliptical cavity in which said reserve pumping source is disposed.

6. In a laser apparatus as defined in claim 5, said semi-elliptical reflectors or said common complementary reflector being driven by a motor to change their positions.

7. In a laser apparatus as defined in claim 1, the two said pumping sources and said laser medium lying in a common plane.

8. In a laser apparatus as defined in claim 7, a common complementary reflector with an elliptical reflective surface which complements each of the first-mentioned said reflectors and has a focal line on which said laser medium lies, and means for rotating said complementary reflector about the last-mentioned focal line thereby to complete an elliptical cavity selectively with either of said first-mentioned reflectors.

* * * * *